This invention relates to an improved radiation image furnace wherein is provided means for obtaining great heat intensities.

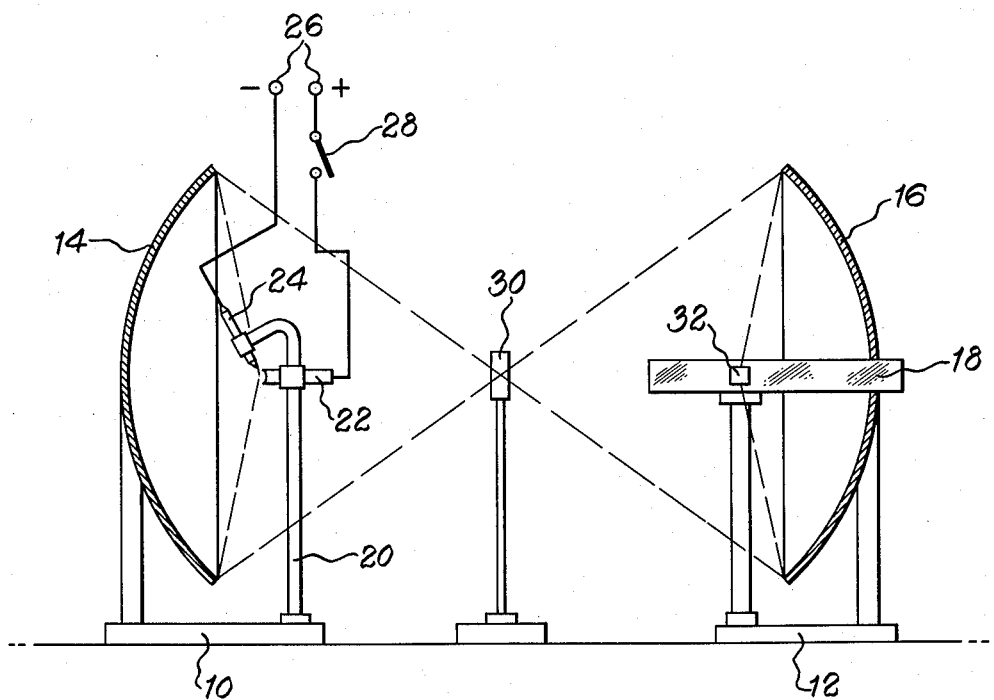
INVENTORS
WILLIAM W. LOZIER
MYRON R. NULL
ATTORNEY 3,001,055
ELLIPSOIDAL RADIATION IMAGE FURNACE
William W. Lozier, Rocky River, and Myron R. Null, Berea, Ohio, assignors to Union Carbide Corporation, a corporation of New York
Filed Oct. 18, 1957, Ser. No. 690,920
9 Claims. (Cl. 219—34)

It has already been proposed to use extremely high levels of radiant energy flux density as a means of producing high temperatures. The two principal means for obtaining this result are the solar furnace, and the arc image furnace. In both of these an optical system forms a small intense image of a bright radiation source. The solar furnace produces high temperatures by means of a large parabolic reflector which gathers and concentrates the sun's radiation into the solar image. The arc image furnace uses mirrors or lenses to form an image of an arc crater.

Furnaces operating in accordance with either of the above outlined ways possess freedom from container contamination by letting the material to be heated serve as its own container, permit atmosphere control surrounding the heated sample, and possess extremely accurate physical control of input heat concentration as well as very short warm-up and cool-off times.

Both types of furnaces present disadvantages which have so far limited their extensive use. The solar furnace suffers from bulk, dependence upon favorable atmospheric conditions, and the need for outdoor operation, being additionally limited to operating during day time hours. The inherent disadvantage of the arc image furnaces hitherto proposed lies in their employment of parabolic mirrors, which are very large in diameter or limited in angular aperture, awkward to control or too expensive.

With a view to overcoming the above outline limitations of prior art furnaces of this type, the present invention has for its main object a radiation furnace consisting essentially of a system of two ellipsoidal mirrors in which the entire energy incident upon the sample converges upon the small figure of confusion of the second focus of the first ellipsoidal mirror, and then diverges to the second mirror to be reconverged finally upon the sample.

A related object of this invention is to provide, in a furnace of the type described, means for controlling the light intensity upon the sample.

A further object of the invention is to provide a furnace of the type described, which employs a carbon arc suitably disposed with respect to a system of ellipsoidal mirrors.

An additional object of the invention is to provide sample holder means associated with a reflecting ellipsoidal mirror, which means may be used to vary the portions of the sample being heated.

These and other related objects and advantages of the present invention will be readily understood from the following detailed description thereof, in particular when taken in connection with the single figure accompanying the description, which figure is a schematic illustration of a preferred embodiment of the present invention.

Referring now to the drawing, there are shown two supporting members 10 and 12, each bearing an ellipsoidal mirror 14 and 16, the position of which may be adjusted with respect to each other. The mirrors 14 and 16 preferably are so placed that the source of radiant energy is at the near focus of mirror 14, the far focus of mirror 14 is made also the far focus of mirror 16, and the sample is placed at the near focus of mirror 16. Thus it is apparent as shown in the drawing by the preferred embodiment of the invention, that the mirrors are separated by a distance equal to the sum of working distances of the two mirrors. Working distance is the distance from one mirror to its figure of confusion, aperture, or far focus. Passing through the geometric center of mirror 16 and adjustably mounted with respect thereto is a heat resistant, transparent sample chamber 18 with sample 32 suitably mounted therein. This chamber may be of cylindrical shape, and is suitably composed of fused quartz. Also suitable are other transparent heat-resistant materials which cause little or no loss in radiant flux incident on the image focal plane. Suitably the chamber may have means for evacuating it or filling it with selected gases or liquids.

At a pre-determined distance from mirror 14 and carried by supporting member 20 is a source of radiant heat. The source shown in the drawing consists of a positive arc light carbon 22 and a negative carbon 24, positioned as shown so as to deliver more heat toward mirror 14 than toward the side away from said mirror. The arc carbons are connected to a suitable source of direct current 26, controlled by switch means 28.

A particularly satisfactory source of radiant heat is a conventional motion picture arc lamp.

The radiant heat provided by the heat source is reflected from mirror 14 through diaphragm means 30 on to mirror 16, and thence to sample chamber 18 positioned at the center thereof. In this system, mirror 14 forms an enlarged intermediate image of the source, and mirror 16 reverses the action of mirror 14, reducing the image to approximately its original size with the large angle of convergence necessary for high image irradiance.

The small cross-section of the beam in the vicinity of the intermediate image of the present system can be used to advantage by positioning diaphragm means 30 as indicated in the drawing. Such means may comprise a small iris diaphragm or a shutter to control the quantity of radiation, the exposure time and radiation time profile. Alternately such means may comprise filters to control the spectral quality of the radiation. Similarly a small diameter plane mirror can be placed at an angle of 45° to the optical axis of the mirrors to direct the optical axis at the image along a vertical direction, which direction may be desirable for certain applications. Additionally, a plane mirror can be disposed at any other suitable angle to direct the optical axis of the reflected beam along any desired direction. A small plane mirror can also be placed near the intermediate image to enable change-over for continuous operation of the system.

Mirrors 14 and 16 may be of the same or of different sizes. In effect, some control over the image size is possible through the use of non-matching elliptical mirrors. Thus the image size can be made larger than the source by substituting for the second mirror a mirror of lower magnification.

Various working examples embodying the inventions were constructed. One such furnace employed an ellipsoidal mirror of 14 inches diameter with a 145° collecting angle and an optical speed of $f/2.25$. The nominal mirror to aperture working distance (to the diaphragm means) for this mirror was 34 inches. A second mirror of identical optical characteristics was positioned on a common optical axis with twice the working distance (68 inches) separating the two mirrors.

Another furnace consisted of 11 millimeter positive carbons fitted into water-cooled carbon holders, an 18 inch diameter forced air-cooled mirror, a reflector having a 5.6 to 1 magnification with a maximum optical speed of $f/1.7$, the mirrors being at a distance of 70 inches part.

The furnace of the invention suitably may be completely or partially enclosed in a container to protect users from the radiation and heat and to effect control of atmosphere around the sample. This chamber may be of the gastight variety to permit evacuation thereof, or filling with inert or other gases.

Generally speaking, the arc image furnace of the invention is able to provide a radiant energy flux more than 11 watts per square millimeter. The temperature attainable, depending upon size, shape, absorption and radiation properties of the sample as well as upon manner of mounting is about 3500° C. for a 200 ampere unit. Such a unit provides radiation intensity and size of heated area equivalent to a 60 inch double parabolic solar furnace under average conditions. Further comparisons between the performance of the double elliptical mirror furnaces of the invention, and those of double parabolic furnaces known to the art appear in the table below.

*Performance of carbon arc image furnaces*

| Positive Carbon Dia., mm. | Arc Current, Amps. | Type of Furnace | Mirror Dia., In. | Irradiance at Center of Image, Watts/mm. |
|---|---|---|---|---|
| 8 | 65 | Double Elliptical | 14 | 6.2 |
| 11 | 190 | do | 18 | 10.2 |
| 10 | 140 | do | 24 | 11.4 |
| 10 | 290 | do | 24 | 14.3 |
| 11 | 75 | Double Parabolic | 24 | 3.7 |
| 16 | 195 | do | 36 | 3.8 |

The furnaces of the invention offer the following advantages over other methods of radiant heating:

(1) Use of transparent sample enclosure permits use of controlled atmosphere or vacuum.

(2) Elimination of sample contamination from heat source.

(3) Elimination of sample contamination from container by using sample as own container.

(4) Instantaneous application of heat.

(5) Accurate control of exposure time and time-intensity profile.

(6) Accurate control of location of heat input.

(7) Continuously variable control of intensity of input energy.

(8) Adaptable to horizontal or vertical operation.

The furnace of the invention may be put to many uses, including zone refining, phase studies, heat treating, evaporation, crystal growing, photo-chemical studies and various operations normally performed in high temperature research.

What is claimed is:

1. A radiation image furnace comprising a heat-transparent sample chamber, first and second ellipsoidal mirrors, said mirrors having substantially coincident far foci, a source of radiant heat positioned substantially at the near focus of said first mirror, said mirrors being positioned on a common optic axis to reflect heat from said source from said first mirror to said second mirror and to said sample chamber, said sample chamber being positioned at the near focus of said second mirror.

2. A radiation image furnace comprising two mutually facing ellipsoidal mirrors having substantially coincident far foci and a common optic axis, a source of radiant heat substantially at the near focus of one of said mirrors and a heat-transparent sample chamber at the near focus of the other of said mirrors.

3. A radiation image furnace comprising two mutually facing ellipsoidal mirrors having susbtantially coincident far foci and a substantially common optic axis, a source of radiant heat substantially at the near focus of one of said mirrors, an adjustable heat-transparent sample chamber substantially at the near focus of the other of said mirrors and means intermediate said mirrors in the path of energy reflected thereby, substantially at the coincident far foci for controlling radiant heat from said source upon a sample in said chamber.

4. The device of claim 3 wherein said mirrors are of different sizes.

5. A radiation image furnace comprising two mutually facing ellipsoidal mirrors having substantially coincident far foci and substantially common optic axis, a source of radiant heat substantially at the near focus of one of said mirrors, an adjustable, heat-resistant, transparent, quartz sample chamber located substantially at the near focus of the other of said mirrors, and filters intermediate said mirrors in the path of energy reflected thereby, susbtantially at the coincident far foci of said mirrors, for controlling the spectral quality of radiation upon a sample in said chamber.

6. A radiation image furnace comprising a heating zone defined by the transverse cross-sections of two mutually facing ellipsoidal mirrors having substantially coincident far foci and substantially common optic axis, a source of radiant heat substantially at the near focus of one of said mirrors, heat-resistant transparent means for holding a sample, said means being positioned substantially at the near focus of the other of said mirrors, means for moving said transparent means toward and away from the hottest point in said heating zone, and shutter means intermediate said mirrors in the path of energy reflected thereby, substantially at the coincident far foci of said mirrors, for controlling radiation upon a sample in said transparent means, whereby radiation incident upon said sample converges upon the small figure of confusion of the second focus of one of said mirrors and diverges to the second mirror to be reconverged upon said sample.

7. The furnace of claim 6, wherein said source of radiant heat is an arc lamp.

8. The furnace of claim 6 wherein one of said mirrors has a 5.6 to 1 magnification and a maximum optical speed of $f/1.7$.

9. The furnace of claim 6, wherein one of said mirrors has a 140 degree collecting angle and an optical speed of $f/2.25$.

References Cited in the file of this patent

UNITED STATES PATENTS

| 1,278,026 | Salto | Sept. 3, 1918 |
| 1,479,923 | Moreau | Jan. 8, 1924 |
| 1,867,502 | Edstrom | July 12, 1932 |
| 2,543,053 | Parker | Feb. 27, 1951 |
| 2,628,533 | Oetjen | Feb. 17, 1953 |
| 2,819,649 | McLeod et al. | Jan. 14, 1958 |
| 2,861,166 | Cargill | Nov. 18, 1958 |

FOREIGN PATENTS

| 387,901 | Germany | Jan. 5, 1924 |
| 530,234 | Germany | July 24, 1931 |
| 791,716 | France | Oct. 7, 1935 |
| 1,061,592 | France | Nov. 25, 1953 |
| 856,196 | Germany | Nov. 20, 1952 |